United States Patent Office 3,187,183
Patented June 1, 1965

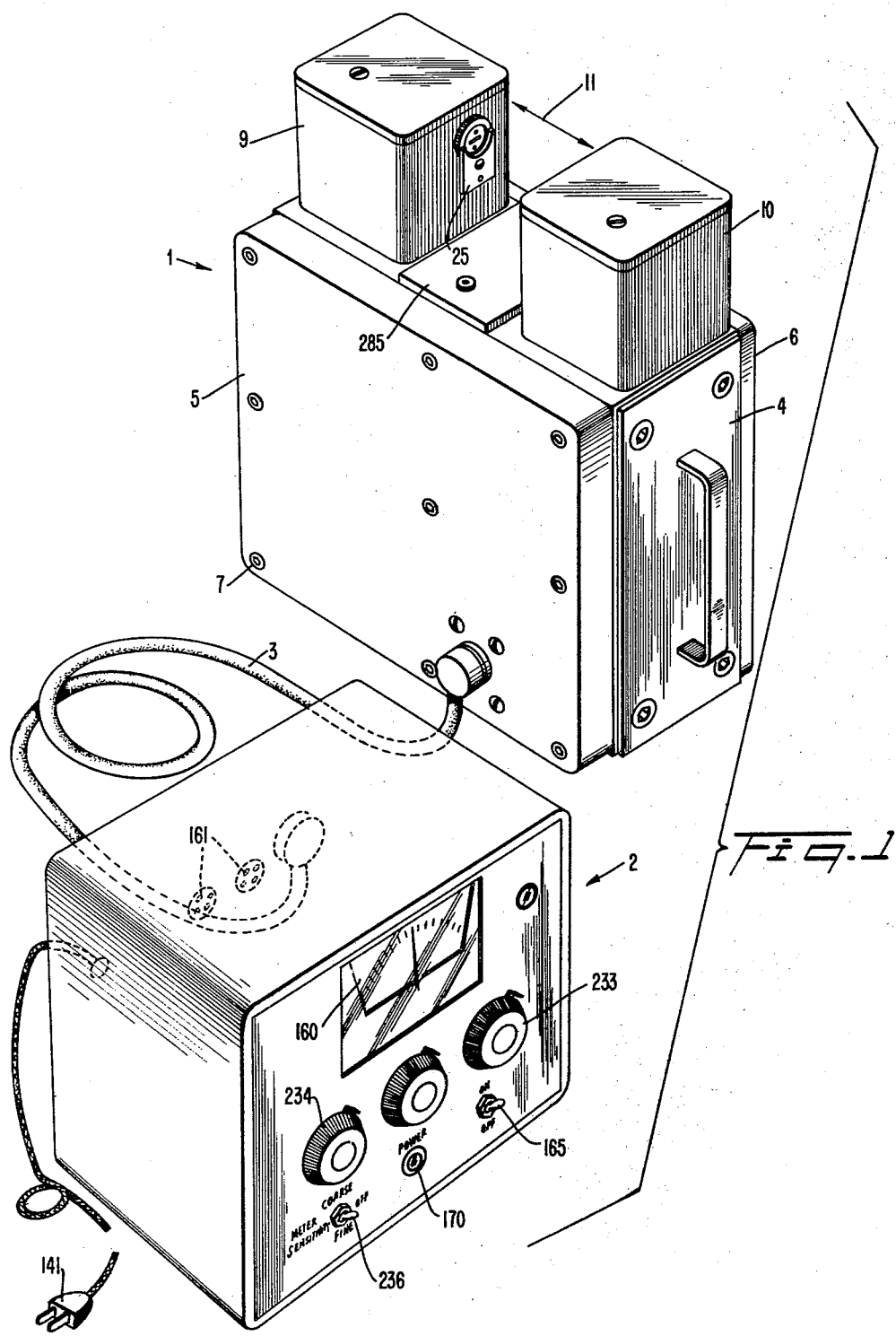

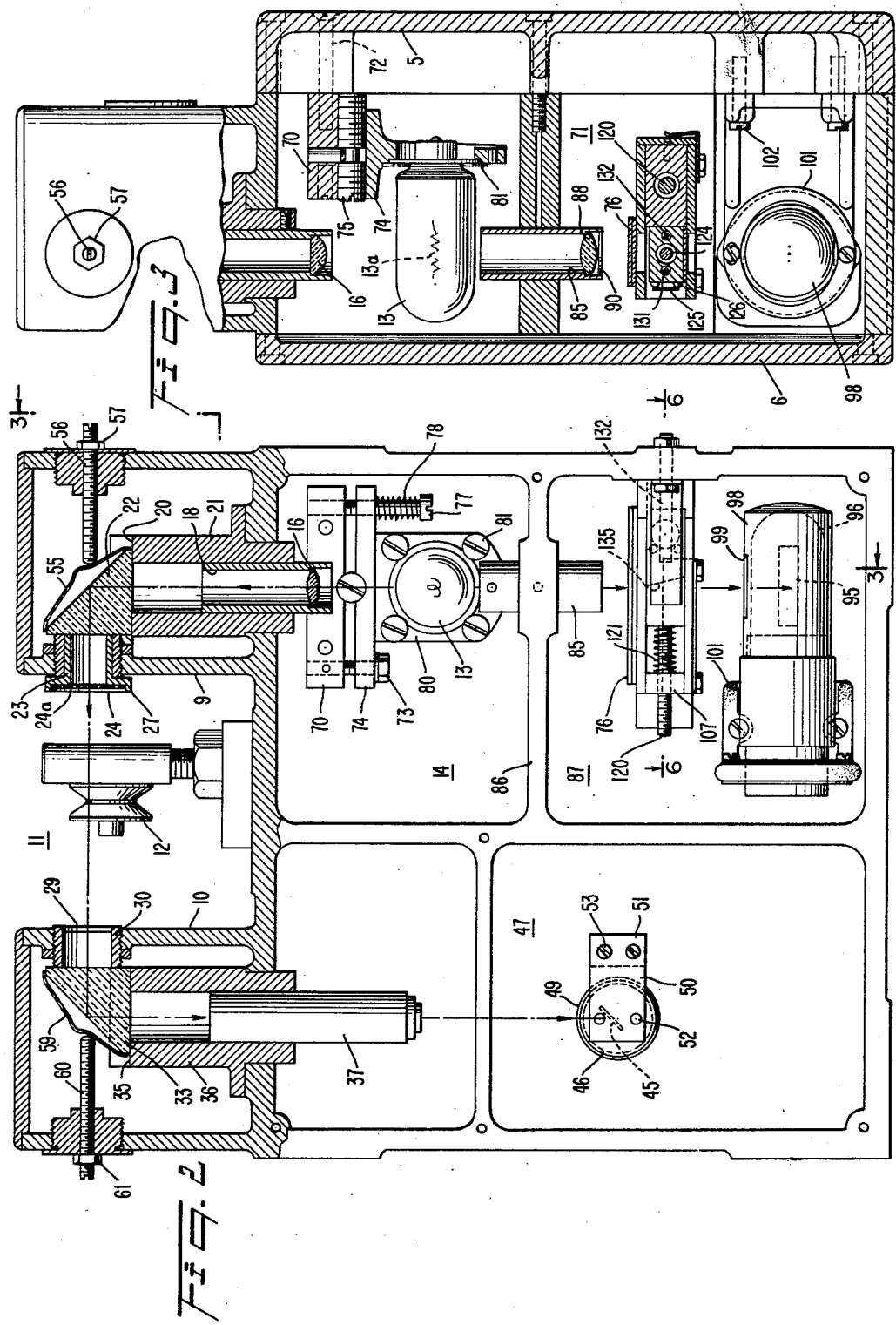

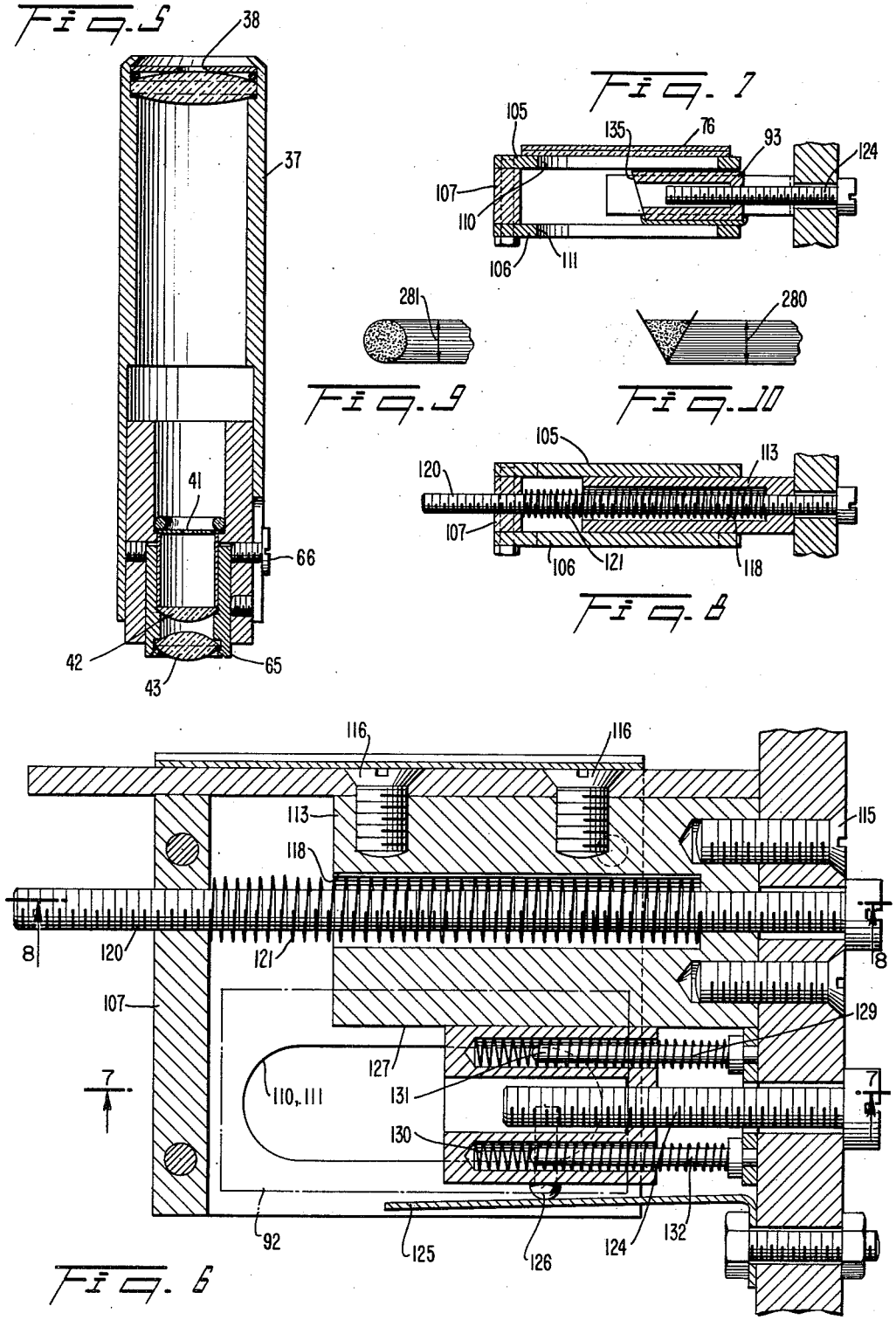

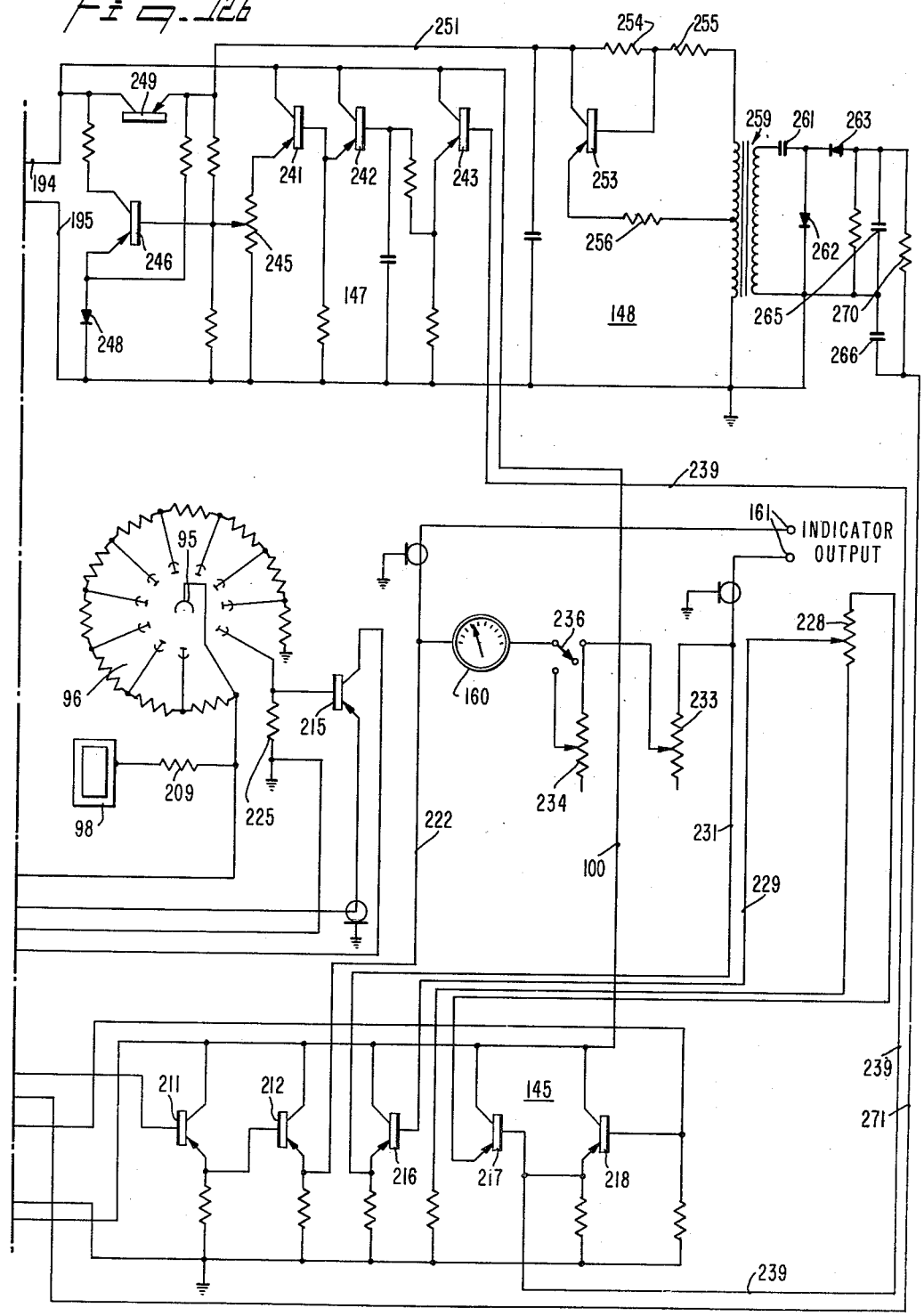

3,187,183
BALANCED OUTPUT PHOTOELECTRIC GAGE
Daniel J. Mindheim, Glen Cove, and Howard C. Lindemann, Westbury, N.Y., assignors to Lindly & Company, Inc., Nassau, N.Y., a corporation of New York
Filed Oct. 17, 1960, Ser. No. 62,971
4 Claims. (Cl. 250—208)

This invention relates generally to electronic monitors and more particularly to a photoelectric gaging and measuring apparatus.

The monitoring and inspection of physical properties of a material or substance and characteristics of articles of manufacture and physical phenomena by photoelectric apparatus capable of selecting or rejecting the article or controlling other operations in accordance with light reflecting or opacity characteristics or capable of monitoring physical dimensions or phenomena by light passage areas are known. These known monitors are usually restricted to specific applications and are incapable of handling minute readings since they are incapable of a high degree of sensitivity and quick response.

It is a principal object of the present invention to provide a highly versatile automatic monitoring, inspection gage usable for gaging and measuring many physical properties of a material or substance and characteristics of articles of manufacture and capable of quantitatively measuring minute changes or variations in the amount of light falling on a measuring photoelectric transducer and representative of changes or variations of a physical characteristic from a desired condition, quantum or value.

Another object is to provide a gage apparatus capable of carrying out monitoring, control, non-destructive, non-contact, intermittent or continuous measuring and gaging functions with substantially any desired scale of sensitivity.

A feature of the photoelectric gage according to the invention is that it is usable for measuring a physical property of a material or substance or characteristic of an article of manufacture in a static condition and because of its quick-response characteristics can measure and gage the physical characteristics of an article of manufacture or physical phenomena under continuous dynamic conditions. The gage measures plus and minus deviations from preselected desired respective values of variable physical characteristics of any number of a plurality of articles of manufacture.

The gage according to the invention is a comparative device provided with a measuring system having a source of light energy and an optical system provided with means defining a light-passage area defining a preselected cross-sectional measuring area of a beam of light. The light-passage area permits light rays to pass across a measuring and gaging zone in which an article of manufacture is disposed for measuring and gaging of a preselected physical characteristic thereof. The measuring system is provided with a light responsive transducer capable of converting light energy to electrical energy upon which the measuring portion of the beam falls.

A compensating system is provided in which another photoelectric transducer is connected cooperatively with the first-mentioned transducer in a variable balanced output condition corresponding to an adjusted set condition of operation in which the balanced output corresponds to the preselected value of the physical quantity or characteristic being measured when a preselected profile area or degree of opacity of an article of manufacture or material is disposed in the measuring zone or the measuring area or portion of the beam. Well regulated and stable circuitry provides power input to the light source and control power to the photoelectric transducers. Output circuitry or means for receiving in operation any output imbalance between the two transducers due to lesser or greater interruption of light rays in said measuring area of the beam than are interrupted at the balanced output condition due to deviation of the characteristic being measured from the desired value thereof makes it possible to control other operations in accordance with the conditions being sensed or read by the gaging apparatus. The gage is provided with means for visually indicating the imbalance or the extent of the imbalance representative of the extent of the deviation of a physical characteristic or physical phenomena from the desired value thereof.

In order to carry out the gaging and measuring function a holding fixture is provided for positioning a standard having a physical characteristic corresponding to the preselected value of the physical characteristic to be measured in the measuring beam in a given position with respect to a fixed reference point so that the balanced output condition may be determined and set. The fixture is employed for holding the article or object to be tested, inspected or otherwise measured and gaged in exactly the same part of the measuring beam area with respect to the fixed reference point. The fixture is constructed as a guide for permitting monitoring of an article, for example the diameter of a wire while moving, limiting movement of the article to be manufactured at least in a plane perpendicular to the light beam.

Generally in measuring strand-like forms such as wire the width of the light passage area is chosen slightly larger than the diameter or profile of the article so that movement in a plane perpendicular to the light beam must be minimized by the guide while movement in a plane parallel to the light beam measuring area is not serious with respect to the introduction of error.

According to the present invention a small change in the amount of light falling on the measuring phototube or transducer will cause an imbalance between the two photoelectric transducers which can be measured and which is a direct function of the amount of light change in the measuring area of the beam and the light change is representative of a deviation from a preselected nominal or standard or desired quantum, or value of the phenomena the beam has sensed and measured.

Other features and advantages of the monitor or gage in accordance with the present invention will be better understood as described in the following specification and appended claims, in conjunction with the following drawings in which:

FIG. 1 is a perspective view of two units, a detecting head or transducer portion and an electronic control unit, electrically connectable to form the monitor according to the present invention;

FIG. 2 is a sectional elevation view of the transducer portion of the monitor shown in FIG. 1;

FIG. 3 is a partial sectional elevation view taken along line 3—3 of FIG. 2;

FIG. 5 is a sectional view of a portion of an optical system of the transducer portion shown in FIGS. 1 and 2;

FIG. 6 is a plan view of a balance adjustment means for varying light impinging on a compensating transducer in the transducer portion shown in FIG. 2 and is taken along line 6—6 of FIG. 2;

FIG. 7 is a detailed elevation view of area and intensity adjustment means of the transducer portion taken along line 7—7 of FIG. 6;

FIG. 8 is a fragmentary cross-sectional view taken along line 8—8 of FIG. 6;

FIG. 9 is a diagrammatic sectional view of a multi-filament yarn;

FIG. 10 is a diagram illustrative of the manner in which a guide holds the yarn of FIG. 9 for monitoring by the gage according to the present invention and is illustrative of the manner in which the guider fixture maintains the nominal diameter of the yarn;

FIGS. 12a and 12b are schematic diagrams of the circuitry, shown in FIG. 11, of the gage according to the present invention.

Figure 4:
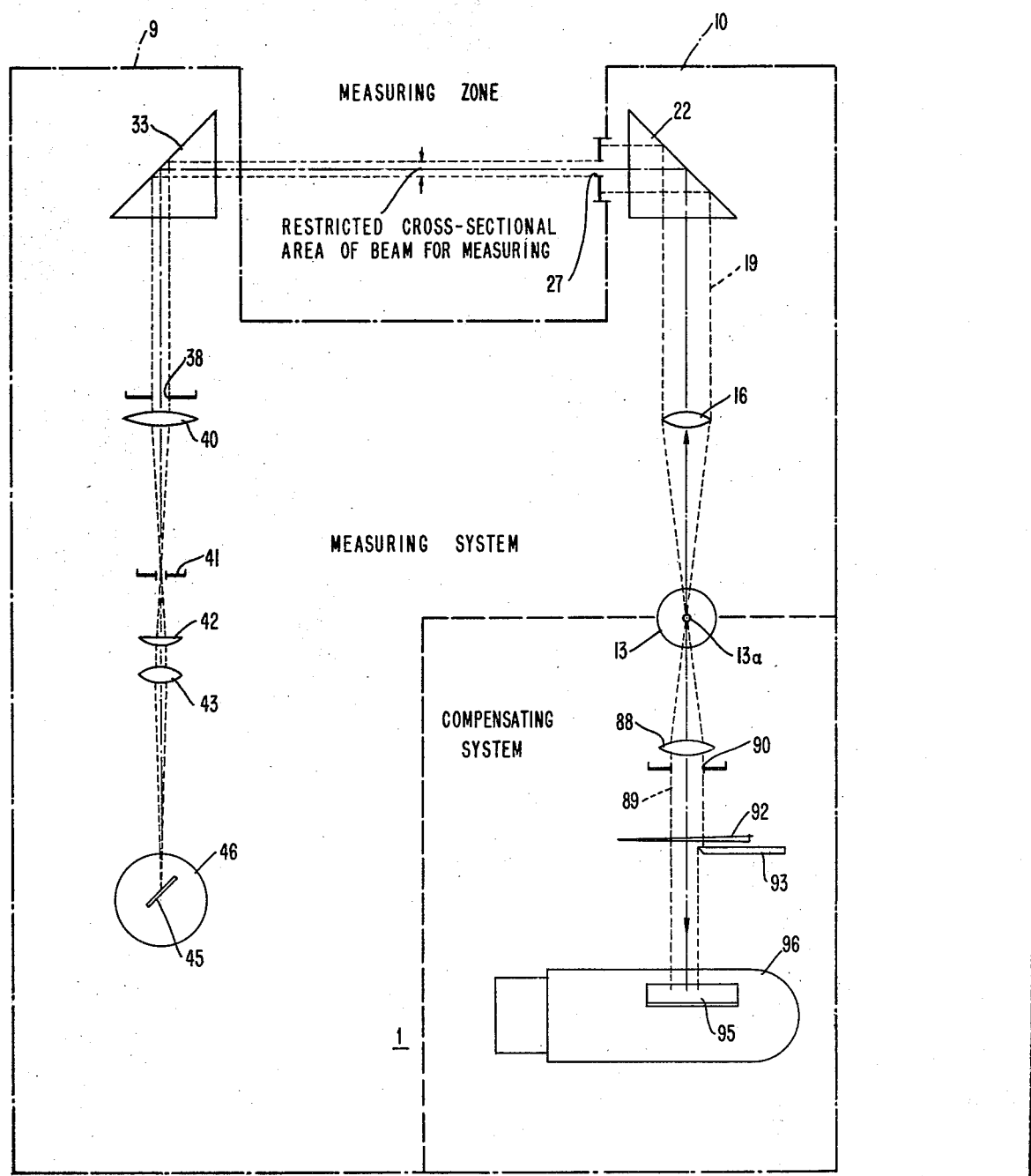
FIG. 4 is a schematic diagram of the transducer portion of the apparatus shown in FIG. 2.

The gage according to the present invention is a compact, highly sensitive photoelectric device for quantitatively measuring minute changes in the amount of light falling on a phototube as later herein explained. A small change in the amount of light falling on a measuring phototube, as hereinafter explained, will cause an imbalance which can be measured and which is a direct function of the amount of light change and the light change is representative of the deviation from a preselected nominal value of a physical characteristic being measured on an article of manufacture. It will be understood that the terms "article of manufacture," "physical characteristic" and "physical phenomena" are hereinafter employed generically with respect to the types of articles and the characteristics measurable with the present invention.

The gage can be used to measure the diameter and uniformity as well as coatings, of such articles of manufacture as wire, filaments, thread, rods, and the like, out-of-roundness of these articles, profiles of small objects, linear dimensions, opacity of translucent materials such as solutions, mixtures, emulsions, strains due to stresses, thermal effects, size of small holes and enumerable other variable conditions or characteristics.

Referring to FIGS. 1–5 the gage consists of two units, a detecting head or transducer portion 1 and an electronic control unit 2 connected to the head by means of a connecting cable 3. The detecting head is formed from a sturdy, precision machined housing 4 preferably made of cast-iron to protect as thoroughly as possible the apparatus from stray magnetic and electrostatic fields. The cast-iron housing is compartmented into light impervious compartments in the manner shown in FIG. 2 and is provided with two side or cover plates 5, 6 securely fastened by fasteners, as for example stripper bolts 7 with the surfaces of the plates contacting the housing 4 made light-tight so that the entire detecting unit or head 1 is free of light internally thereof except that provided as hereinafter described. The detecting head 1 is provided with end handles 8 for transporting it and for positioning it for use in any desired position.

The casting or housing 4 is provided with two upstanding projections or turrets 9, 10 between which is formed a measuring zone 11 in which an article of manufacture, material or substance, not shown, is disposed on a guide or fixture 12 for measuring a physical property or characteristic thereof. Within the detecting head 1 is mounted a measuring system consisting of a light source lamp 13 housing a coil filament 13a and mounted within a light impervious compartment 14. The filament is of minimum diameter to approximate a line source of light so that the light rays therefrom will be as uniform in intensity as possible. Light from the light source lamp 13 enters the measuring system through a collimating lens 16 in a tube 18 of an optical system which makes the light rays optically parallel into a light beam 19 which passes upwardly through the tube member 18 to a light bending means comprising a 90°–45° prism 20 mounted on a flat top surface 21 of a tubular lens mount 22 formed in the casting 4 and in which the tube 18 is disposed coaxial therewith. The beam 19 is bent so that the light rays thereof pass outwardly of turret 10 through an externally threaded bushing 23 in which a flanged sleeve 24 is disposed having a window or opening 25 and a removable opaque disc 24a therein held by an aperture clamp plate 26. The disc has a rectangular aperture 27 defining a light passageway restricted in width so that a portion of the beam forming a cross-sectional measuring area of the beam corresponding in area to the width and length of the aperture 27 traverses the measuring zone 11 and enters the turret 9 through a window 29 formed in an externally threaded bushing 30 and falls on a light bending 90°–45° prism 33.

The prism 33 is mounted on a flat top surface 35 of a tubular lens mount 36 formed in the casting 4 symmetrical with the lens mount 22. The prism 33 bends the measuring portion of the light beam downwardly so that it passes through a tubular element 37 of the optical system mounted coaxial with the tubular prism mount 36. The light passes through a rectangular aperture 38 formed at one end of element 37 and which is normally at right angles to rectangular aperture 27. The aperture 38 restricts the light beam in length, as for example to ⁹⁄₁₆″, as against the restriction in width imposed by aperture 27. Whereas aperture 27 is readily replaceable the aperture 38 has a fixed dimension.

The restricted light beam then passes through a lens 40 mounted in the element 37 adjacent aperture 38 and is converged by it to form an image of the light source filament 13a in the plane of a very small third aperture 41 spaced axially from the aperture 38 in the tubular element 37 and which is only slightly larger than the image of the lamp filament 13a thereby to preclude spurious or stray light from entering the optical system at even a small angle relative to the light beam. The light from the filament image diverges after passing through aperture 41 and enters a lens system in the element 37 axially spaced from the aperture 41 and consisting of a plano convex lens 42 and a double convex lens 43 which cause an enlarged image of the filament 13a to be focused on a cathode 45 of a measuring photomultiplier tube 46 disposed in a compartment 47 of the casting 4 which is impervious to light other than the beam entering therein through the optical system described.

The optical arrangement disclosed has the effect of making the illuminated area on the cathode 45 independent of the size of either aperture 27 or an object or article placed in the light beam in the measuring zone. Moreover, the system is intended to maintain the same cathode area always exposed so that after a period of time the cathode arrives at a stable emission area and changes of the aperture 27 or object size will only result in changes in intensity of illumination. It is readily apparent that if the exposed area were changed, of course, each newly exposed portion would take a considerable length of time to reach stability.

In order to further maintain the stability of operation the measuring photoelectric tube or transducer 46 is enclosed in an electromagnetic shield 49 provided with a slit, not shown, through which the light enters thereby to preclude any possible effect of stray magnetic flux from affecting the electron flow from the cathode 45. The measuring photoelectric tube or transducer is rigidly mounted, to preclude movement of its exposure area, by using a non-conductive plastic element 50 secured to the shield 49 and to a shield support post 51 on the housing 4 by screws 52, 53 respectively so that the area of exposure never changes and the stability of operation of the unit is insured regardless of vibration conditions under which measurements are being taken and regardless of the position of the unit 1.

The housing mounts 22, 36 on which the prisms 20, 33 are mounted are preferably symmetrical and each are provided with respective flat surfaces 21 and 35 on which the two prisms can be moved for properly adjusting the optical system and raising and lowering the light beam. The prism 20 bears against an end face of the sleeve or bushing 23 and since the sleeve 23 is externally threaded its axial position in the turret 10 can be preset. A spring 55 bears against the prism 20 and a threaded screw 56 is provided with a lock nut 57 to adjustably control the tension holding the prism 20 in position and allow a screw driver setting thereof. In a similar manner the sleeve or bushing 30 is externally threaded and is provided with an end face axially adjustable in position and against which the prism 33 bears with a spring 59 applying bearing pressure thereto under adjustable control of a threaded screw or member 60 provided with a lock nut 61 so that the center of the beam can be properly adjusted to pass through the center of the various apertures 27, 38 and 40.

Moreover, in order to properly adjust and maintain the optical system in proper alignment the tube element 37 is (FIG. 5) provided with an internal member 65 held in position by a set screw 66 so that the filament is focused in the plane of the slit 41. An internal sleeve 67 mounts the lens 42, 43 and is held in an adjusted position by a set screw 68 such that an enlarged image of the filament is focused sharply on cathode 45. The filament 13a of the light source is properly positioned in a centered position with respect to the optical axis of the lens 16 by an adjusting and setting arrangement consisting of a fixed member 70 securely mounted by screws 72 extending inwardly from plate 5 and on which is mounted a threaded lamp base centering screw 73 movably supporting a lamp base centering member 74 cooperative with a pivot 75 about which it pivots for angular movement with respect to pivot 75 under control of the lamp base centering screw 73 and a screw 77 threaded into the fixed member 70 and having a spring 78 circumferentially thereof bearing on the centering member 74. The centering member 74 is provided with a projection 80 on which the light source base is removably mounted by binding head screws 81 so that it is readily apparent that by adjustment of the centering screw 73 the filament can be properly aligned or centered with respect to the optical axis of the lens 16.

As indicated heretofore the gage according to the invention is a comparative measuring device and is provided with a compensating system in the head or transducer portion as hereinafter described. Light from the small coil filament 13a of the light source 13 enters a tubular member 85 extending downwardly through a partition 86 into a light-tight compartment 87. The tube is provided with a collimating lens 88 which makes the light rays parallel into a beam 89 and which passes through an aperture 90 in the tube 85 to give the beam a desired shape and area. The beam 89 then passes through an adjustable optical wedge arrangement 92 which can be moved back and forth to change, in a manner later herein described, intensity of the light beam. An adjustable mask 93 more fully described hereinafter cooperates with the optical wedge for controlling the area and intensity of a beam of light falling on a cathode 95, shown diagrammatically, of a compensating transducer or photomultiplier 96 provided similarly to the transducer or photomultiplier 46 with an electromagnetic shield 98 having a slit 99 through which the light beam passes. The photomultiplier 96 is provided with a base 101 securely anchored to component mounting plate 5 by means of threaded screws 102 thereby securely anchored to preclude any change of value of the exposure area of the cathode 95.

As indicated heretofore the gage according to the invention is a comparative gage in which the transducer means or photomultipliers 46, 96 are cooperatively connected as later herein explained in a variable balanced output condition corresponding to an adjusted condition of operation in which the balanced output corresponds to a preselected value of the physical quantity being measured when a preselected profile area of an article of manufacture, not shown, is disposed in the measuring zone in the measuring area of the measuring beam.

In order to obtain the balanced output condition a balanced control adjust means for controlling the area and intensity of the beam in the compensating system an optical balancing system comprising the optical wedge 92 and the mask 93 are mounted on a side of the detecting head. This optical balance system is intended to aid in the matching of the decay curves of the two photomultiplier tubes so that their outputs will remain the same for as long as possible. To maintain this balance the area control means comprising the mask 93 and the intensity control means comprising the wedge 92 are used to regulate the decay over a period of time of the compensating phototube. This control over the decay of the compensating phototube 96 is normally balanced against the decay rate of the measuring phototube 46 when the two tubes decay at the same rate an optimum balanced condition is achieved. The area control and intensity control are intended, as hereinafter more fully explained, to balance the change in output or current per unit time $dI/dT$.

The balance control adjustment means consists of (FIGS. 6–8) a pair of oppositely disposed spaced plates 105, 106 spaced apart by a spacer 107 and having apertures 110, 111 respectively, in registry through which the light beam 89 passes to impinge on the cathode 95 of the compensating transducer. The plates 105, 106 are disposed for axial travel on a member 113 fixed to the casting 4 by fasteners in the form of flat head screws 115, 116 and having a hole 118 through which passes a threaded balance screw 120 having a compression spring 121 circumferentially thereof. The threaded balance screw 120 is threaded into the spacer 107 holding the plates 105, 106 apart and extends outwardly of the housing so that by axial adjustment of the screw 120 the axial position of the plates 105, 106 is controlled. The optical wedge 92 is cemented on upper plate 105 overlying the registered apertures 110, 111.

The optical wedge 92 controls the intensity of the light beam 89 passing through the balance control apertures 110, 111. The wedge is constructed with variable light transmission qualities along its axial length so that by clockwise and counter-clockwise rotation of the intensity control or balance screw 120, the axial position of the wedge 92 is controlled.

In order to vary the light passage area of the balance control apertures the mask 93 is disposed between the two plates 105, 106 and is free to travel axially along the length of the balance control apertures under control of an area control screw 124 extending outwardly of the housing 4. The mask 93 is resiliently held by a spring 125 bearing on a button head 126 of the mask urging the mask against a bearing or guide surface 127 on the fixed member 113. The mask is urged in a direction toward closing the balance control apertures 110, 111 by a pair of springs 129, 130 housed in respective recesses in the mask as shown and disposed circumferentially of pins 131, 132 respectively with the area adjust screw 124 fixed in the mask and resisting the force of the springs 129, 130 so that by clockwise and counterclockwise rotation of the screw 124 the effective area of the compensating beam 89 is controlled. The mask 93, is of course, light impervious and is preferably provided with a tapered end furnishing a knife edge 135 for intercepting the rays of the compensating beam. Moreover, the various balance adjust screws are preferably covered over by a removable cover, not shown, externally of the housing to preclude undesired tampering with the set balanced condition.

Figure 11:
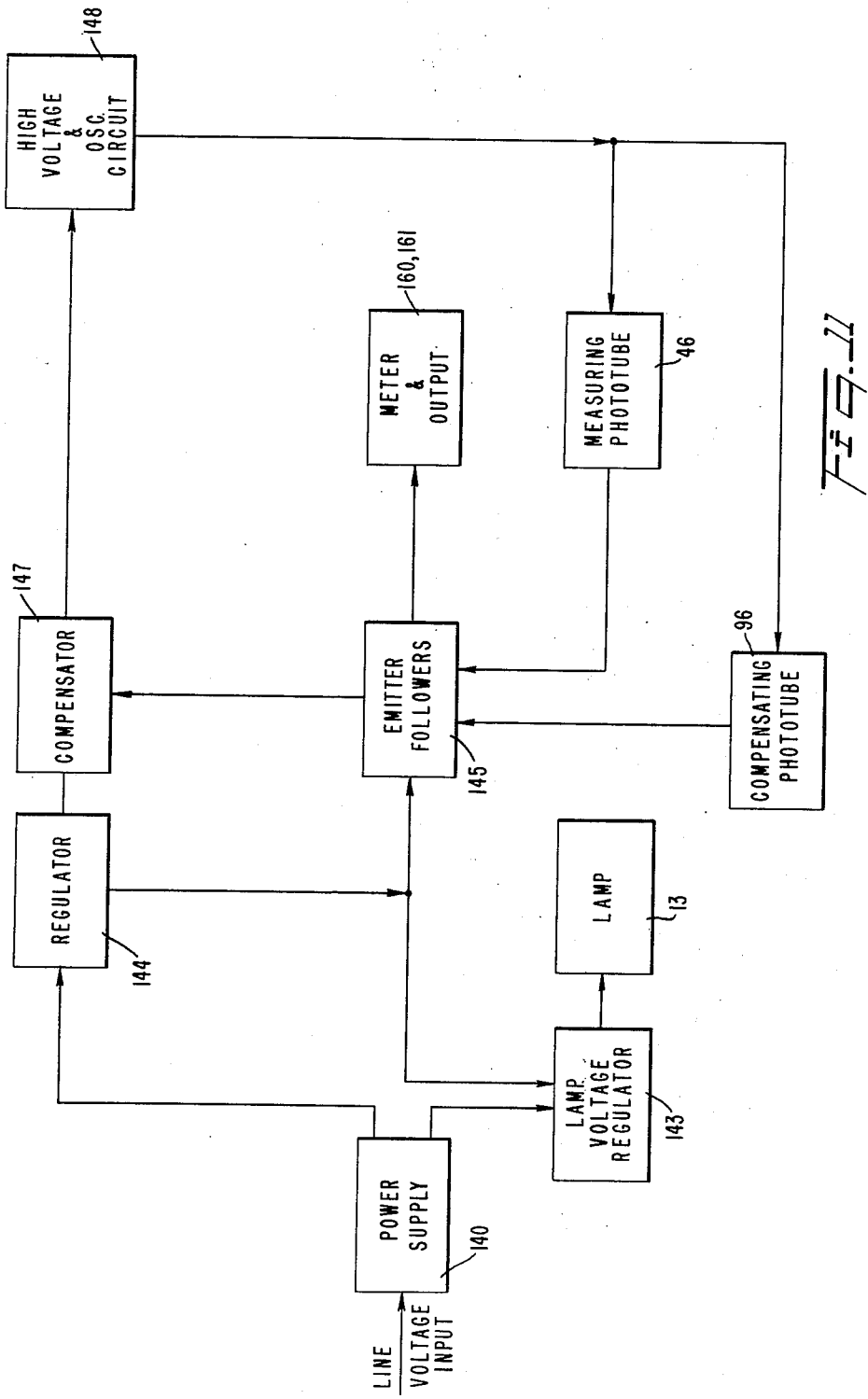
FIG. 11 is a block diagram of the electronic circuitry of the units of the monitor shown in FIG. 1.
Figure 12A:
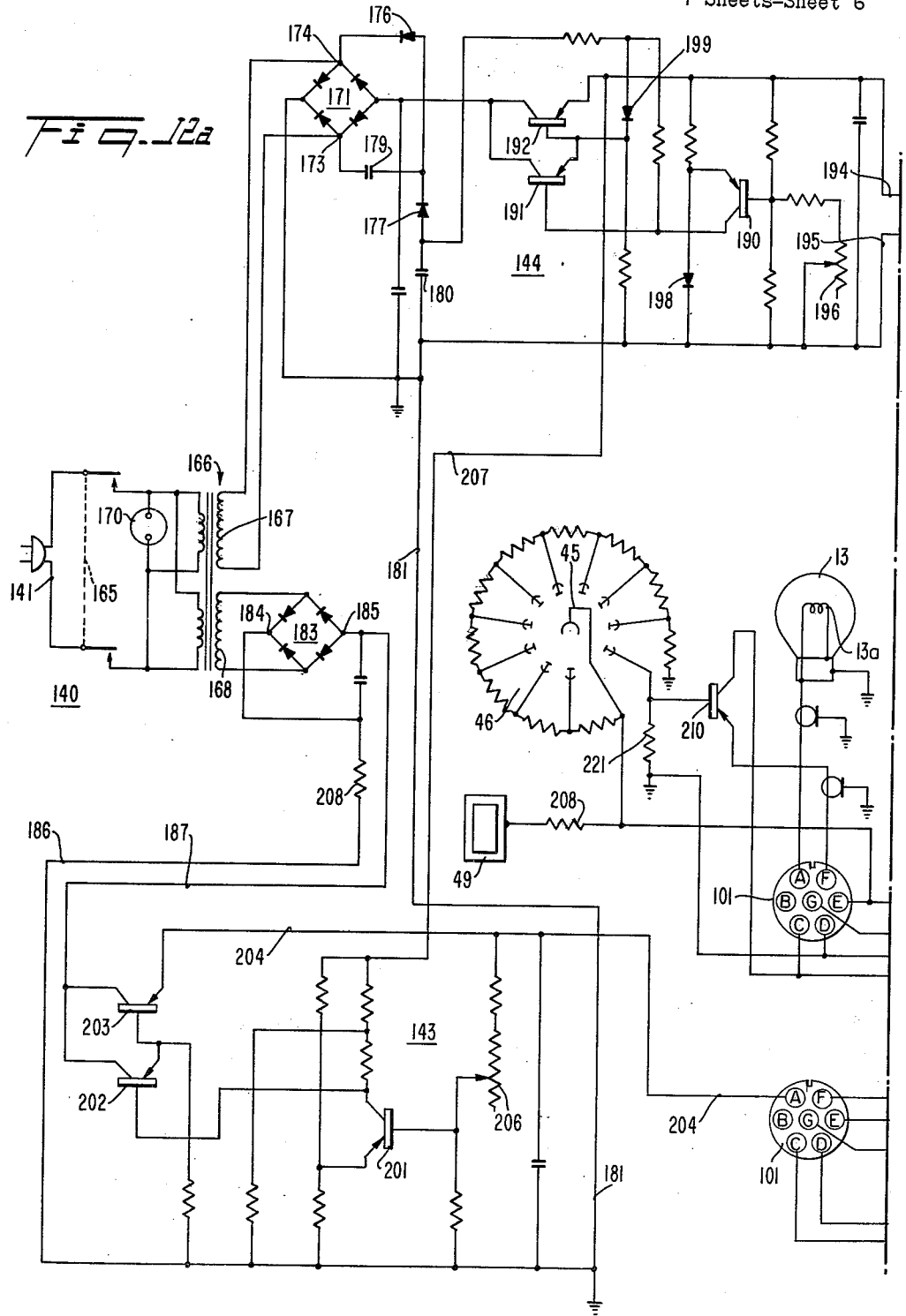

The gage according to the invention operates on the fact that when the profile or an object being gaged is placed in the measuring area of the beam deviates from a desired value of a characteristic thereof a change in the light at the surface of the measuring phototube cathode 45 will produce a change in the current from the phototube 46. In order to obtain optimum sensitivity and accuracy the gage is supplied (FIG. 11) with well regulated circuitry of utmost stability later described in detail. A power supply 140 in the control unit 2 is connected to a line voltage with a lead 141 and transforms the line voltage to a D.C. filtered output applied to a lamp voltage regulator circuit 143 which applies a low level voltage to the light source lamp 13 and a collector voltage regulator 144 whose output is connected to collectors of a transistorized lamp voltage regulator 143 and to collectors of emitter follower circuits 145 which are connected as part of a self-compensating loop as later herein disclosed.

The voltage regulator circuit 144 has a well regulated ripple-free output for use as a supply to a high voltage compensating circuit 147 functioning essentially as a feedback regulator and applying an output to a high voltage oscillator circuit 148 which applies its output to the measuring phototube 46 and the compensating phototube 96 operably connected in a balanced circuit and to the emitter followers which made it possible to obtain extreme stability. The output of the phototube is metered as a balanced output when there is no change in the light impinging on the measuring phototube and as an imbalance corresponding to the physical characteristic deviation as indicated heretofore. The metering of the phototube outputs is made by a highly sensitive meter 160 which is mounted on the control unit and can be calibrated to read deviation from a known standard on almost any desired scale. The meter may be a transistorized zero center limit meter which has two adjustable contacts, not shown, that can be set to operate through relays in the control unit, not shown, some external signal or control system, not shown, when the high and low limits are reached.

Moreover, the output of the phototubes can be applied to necessary equipment for recording, signalling, stopping, switching and controlling, etc., by connection of the equipment to be controlled etc. to output receptacle circuits 161. These output circuits permit other devices to be attached to the control unit so that the response of the device is proportional to the output signal which becomes its input signal. Moreover, as indicated heretofore a high and a low limit relay, not shown, are connected to the output and will either open or close an external circuit at preset high and low limits as the meter 160 reads plus or minus deviations from zero.

Power supply

The power supply 140, for both the lamp voltage regulator 143 and the voltage regulator 144 which functions as a collector voltage regulator, is provided with the lead 141 and an on-off switch 165 for connecting the control unit 2 to a source of line voltage, not shown. The desired voltage is obtained by transforming the line voltage, which may be 115–230 volts, 50–60 c.p.s. by a transformer 166 which has two secondary output windings 167, 168 for applying power to the collector voltage regulator 144 and the lamp voltage regulator 143 respectively. A power pilot light 170 is connected as shown to indicate when the switch 165 is on the on condition.

The output voltage of winding 167 is applied to a silicon bridge rectifier 171 and a D.C. filtered output of this circuit is taken out at D.C. terminals 173, 174 and applied as collector voltage in the volt regulator circuit 144 as hereinafter explained. A voltage doubler consisting of a pair of diodes 176, 177 and a pair of capacitors 179, 180, is connected to the regulator circuit 143 by a lead 181 and to ground. The other secondary winding 168 of the transformer 166 is fed into a silicon bridge rectifier 183 and a D.C. filtered output is taken out at D.C. terminals 184, 185 and applied to the lamp voltage regulator circuit 143 along two leads 186, 187.

Voltage regulator circuit

The regulator circuit 144 utilizes transistors and zener diodes where essentially the transistor is the series element that absorbs voltage changes and the zener diode is the shunt element to control the output level. The circuit is actually a feedback regulator. In this circuit it is necessary to provide power gain. This is accomplished by a control transistor 190 and a transistor 191 in series. A series regulator transistor or power transistor 192 is connected to absorb the voltage changes. The regulated output voltage is ripple free and is led out of output leads 194, 195 and is obtained by setting a potentiometer 196, connected to the base of the transistor 190, to a correct or desired value. Any change in the output voltage is impressed across the base of the control transistor 190. A reference voltage from a zener diode 198 maintains the emitter of the control transistor 190 at a constant voltage. The collector voltage of the control transistor then changes inversely with the voltage change on the base and this change is fed to the base of the series transistor 191, which functions as an emitter follower. A zener diode 199 is connected in the regulator circuit to maintain a constant voltage drop from the voltage doubler circuit to the emitter of the emitter follower transistor 191. The change at the emitter of this transistor is directly coupled to the power transistor 192.

The output from the emitter of the power transistor 192 is a well regulated, ripple free output for use as a transistor collector supply applied to the compensator 47 by connections 194, 195 as shown and applied to the emitter follower circuit by a circuit 100.

Lamp regulator circuit

The lamp power supply or lamp regulator circuit 143 is substantially similar to the regulator circuit 144. A control transistor 201 in series with a series transistor 202 jointly function substantially similar to the transistors 190, 191 of the voltage regulator circuit. A power transistor 203 in series with the rectifier 183 provides a well regulated output voltage along an output lead 204 connected to a base pin A for providing a steady lamp voltage to the lamp 13. In order to maintain the lamp voltage at a desired level a potentiometer 206 connected to the base of the control transistor 201 is provided.

In the lamp regulator circuit a reference is not obtained by use of a zener diode in the manner of the voltage regulator circuit. Instead the regulated output of the voltage regulator circuit is applied to the collectors of the transistors of the lamp regulator circuit along a lead 207. In order to protect the gage a protective resistor 208 is utilized to prevent damage if the lamp accidentally shorts. This resistor is in series with the lamp regulator circuit 143 so that if a short occurs the current will be limited, for example to about one ampere.

Photoelectric transducers

The photoelectric transducers used in gage according to the invention are photomultipliers. They operate on the following principle:

As the light from the two beams 19, 89 hits the photo sensitive cathodes 45, 95 electrons are emitted. These electrons are drawn with high velocity to a more positively charged dynode. When they hit the dynode more electrons are dislodged and they are attracted with high velocity to a still more positively charged dynode. This procedure occurs in all ten stages of each of the photomultiplier tubes, until a comparatively large current is built up for a given change in total light incident on the photo-cathode. In normal operation, as a photomultiplier is used its sensitivity decreases. This is in great part overcome by use of the novel high voltage compensating circuit 147 to be described later.

The two photomultipliers in this equipment are used in a balance circuit. To maintain this balance an area control and an intensity control as heretofore explained are used to regulate the decay over a period of time of the compensating phototube. This control over the decay of the compensating phototube 96 is normally balanced against the decay rate of the measuring phototube 46. When the two tubes decay at the same rate (note that it is the change in output [or current] per unit time that is balanced, $dI/dT$), optimum conditions are achieved. Once the area and intensity or balance control means has been adjusted, it is seldom necessary to adjust again.

The phototube shields 49, 98 are connected to the cathodes 45, 95 of their respective photomultipliers in series with resistances 208, 209 respectively to protect the electron beams from any stray magnetic or electrostatic fields so that the outputs of the photoelectric transducers substantially correspond to the light impinging on their respective cathodes.

In order to simplify the drawings the photomultiplier bases are shown schematically as a common base 101 with pins as indicated. The various pin connections are as shown and later explained.

Emitter follower circuit

The output from the measuring phototube 46 and the compensating phototube 96 are each directly coupled into emitter follower circuits consisting of transistors 210, 211 and 212 in cascade, and transistors 215, 216, 217 and 218 in cascade for the measuring and compensating circuits respectively. The transistors 210 and 215 are mounted in the detecting head, while the remainder of the transistors are in the control unit. The voltage output of the measuring phototube 46 is taken across a resistance 221 and depends on the size of the object being measured and the size of the aperture 27 being used. This voltage is then directly coupled from the emitter of transistor 210 through a pin F to the base of the succeeding stage, transistor 211, 212, until it is fed along a lead 222 to one side of the sensitive meter 160. The three transistor stages used are primarily for lowering the impedance and thus increasing the current, with little or no loss in voltage.

The voltage from the compensating phototube, is taken across a resistance 225. This voltage is then directly coupled from resistor 215 through a pin G to each transistor cascade 215, 216, 217, 218 exactly as is the voltage from the measuring phototube 46 described above. However, from the emitter of the transistor 217 a zero adjust potentiometer 228 is connected. This potentiometer is used to divide the voltage in order to obtain a zero reading on the sensitive meter 160 which is preferably a micro-ammeter. The output from the center of the zero adjust potentiometer 228 is fed along a lead 229 into the base of the transistor 216. From the emitter of this transistor a lead 231 is connected two meter sensitivity controls consisting of a "fine" potentiometer 233 and a "coarse" potentiometer 234 in series with the meter 160 used to determine the meter for selectivity and alternatively connecting the potentiometer 233 in series with the meter 160 or connecting both potentiometers in series with the meter and the switch, has an off position in which it is shown. The position in which the meter switch connects only the "fine" potentiometer 233 in series with the meter 160 is hereinafter referred to as "fine" and the other position is referred to as "coarse." With the meter switch 236 at "fine," the fine sensitivity control of potentiometer 233 puts, for example, all or part of 5,000 ohms in the meter circuit. With the meter switch 236 at "coarse" the coarse sensitivity control potentiometer puts, for example, all or part of 50,000 ohms in the meter circuit, as well as the fine sensitivity which may be used as a vernier adjust for the coarse control.

As indicated heretofore output connections 161 are provided for connecting the "reading" of the monitor to recording equipment or to control other equipment, as for example if the output exceeds a certain value a machine under control of the monitor may be stopped. The circuit 100 provides the regulated voltage output of the regulator to the emitter followers through collector connections as shown and is connected to a pin C to provide collector voltage to the two emitters 210, 215 next to the phototubes.

The differential output voltage is obtained from the emitter circuits of transistors 212, 216. Therefore, it is comparatively independent of the two potentiometers 233, 234 in series with the meter. However, when the differential output is being used at high sensitivities and the meter switch is on "fine" then the output impedance of the gage is quite low and some slight loss may occur. When the output voltage is being fed to a recorder or other equipment it is preferable that the meter switch 236 be in the "off" position to keep the output impedance constant.

High voltage compensating circuit

As indicated heretofore the high voltage compensating circuit 147 is essentially a feedback regulator, not unlike the regulator 144 and lamp regulator 143 described previously. The output from the compensating phototube 96 is directly coupled to transistors 215 and 218. From the emitter of the transistor 218 the voltage is fed by a compensation feedback circuit into the compensator circuit transistors 240, 241, 242. The correct voltage is obtained from a potentiometer 245 and directly coupled into the base of a transistor 246 which functions as the compensator control transistor. The emitter of the compensator control transistor 246 is held at a constant reference voltage by the zener diode 248. The collector of this control transistor 246 is connected to the base of a series transistor 249 in the compensating circuit. As can be seen from the foregoing, the output voltage of the compensator circuit is dependent on the input voltage to the base of the control transistor 246. This in turn depends on the output voltage of the compensating phototube 96. If the output voltage of the phototube 96 decreases with time, as it must with all photomultipliers the input voltage to the control transistor 246 will also decrease. Since the emitter of the control transistor 246 is held at a constant reference voltage, the collector output will increase and the output of the series transistor 249 will, therefore, increase.

High voltage oscillator circuit

The output from the compensating circuit series transistor 249 is a compensating voltage applied to the collector of a transistor 253 of the oscillator circuit and supply 148. The oscillator circuit comprises the oscillator transistor 253 to which are connected three resistances 254, 255 and a transformer 259 as shown. The output of this oscillator has a preselected frequency, for example, of about 7500 c.p.s. and is transformed to a high voltage by the transformer 259. This high A.C. voltage is directly dependent on the collector voltage at the oscillator transistor 253. This means that, depending on the output of the compensating photomultiplier 96, the oscillator output voltage will vary, for example, from 200 volts to 400 volts.

The output voltage of the transformer is fed into a half-wave voltage doubler rectifier circuit, consisting of a capacitor 261 and a pair of rectifiers 262 and 263. This enables a minus D.C. voltage to be obtained, for example, minus 280 volts to minus 550 volts D.C. across each of the rectifiers or a minus D.C. voltage across two output capacitors 265, 266, for example, minus 550 to 100 volts D.C.

The theory of the voltage doubler is that the input capacitor 261 to the junction of the two silicon rectifiers 262, 263 charges to the peak supply voltage so that the voltage fluctuates between zero and twice the supply voltage. The output capacitors 265, 266 hold the voltage to twice the input voltage. Hence the terminology "doubler."

The output capacitors 265, 266 in conjunction with a resistance 270 filter the D.C. output eliminating therefrom A.C. ripple. The variable regulated (B—) D.C. voltage is fed to the two photomultiplier tubes along a lead 271 connected to pin E to which the two cathodes are connected. The output of the photomultipliers is dependent on the D.C. voltage applied. Therefore, as the compensating phototube decays, the action of the compensating circuit 147, the oscillator and the half-wave voltage doubler circuit 148 combine to increase the supply voltage in order to maintain the same phototube output.

In order to set the balanced output condition it is readily apparent that a standard having the physical characteristics to be measured at the desired quantum or value is inserted in the measuring beam in the zone 11. The standard object or material which is to be measured or gaged is held on a guiding fixture, as for example fixture 12, to zero and calibrate the instrument or apparatus. A standard nearest to the nominal in size herein termed the nominal standard is used for zeroing the apparatus. Another standard herein termed the calibration standard which does not differ from the nominal by more than twice the measuring tolerance desired is used for calibrating the apparatus. The closer the two standards are to each other in size the greater the sensitivity setting that can be obtained. The sensitivity setting can be set to cover a wide range of measuring sensitivities and sizes of objects being gaged.

For any particular gaging problem, it may be necessary to set to the desired sensitivity as well as calibrating for the object size. For example, if it is desired to gage three different wire sizes (.001, .050 and .100) to about the same degree of sensitivity three different apertures 27 would be used. An aperture of .050" width is the smallest practical size for the example application and three apertures of .050, .100 and .150 would be chosen so that the difference between aperture size and wire diameter is about the same in all cases (.049–.050). That is, the amount of light falling on the measuring phototube, i.e., by-passes the object or articles being gaged, is approximately the same in all cases resulting in about the same sensitivity in each of the three situations. The instrument is thus set so that the amount of light falling on the phototube is the same in all cases since if the light is not the same in all cases this will result in different sensitivity in each of the three situations. It is readily apparent that where a high degree of measuring sensitivity is required a standard or master is used that is as near as possible to the nominal size of the article being measured. The reading on the meter, although quite linear over its entire range, is not perfectly linear. For relatively coarse measurements any known standards may be used, provided only that meter readings for the two standards in the object can be obtained at the same sensitivity setting.

As indicated heretofore the gage is designed to perform many different kinds of gaging and measuring operations involving objects and materials of different sizes, shapes and kinds so that the holding or guiding fixture should be made in conformance with the reading that is to be taken. For example, if the object or article being measured is in the form of wire, filament, thread, ribbon, rod, etc. the standard should be positioned by means of the proper holder or guiding fixture so that it lies in the center of the light beam as revealed by its shadow cast on a piece of white paper held between it and the prism 33. For optimum accuracy only the central portion of the light width should be used so that at the aperture 27 it is about .050" wider than the standard or object. Wider apertures can be used for lesser sensitivity reducing the necessity for careful centering and permitting more variation of movement of the object in the case of dynamic measurements.

In the dynamic gaging of a strand-like material for diameter and uniformity the guiding is done in such a manner that the material is centered in the light beam, and not allowed to wander from side to side or vibrate, jump or drift up and down in a plane parallel to the light beam. Preferably a tension device, not shown, is ordinarily used to aid in making the strand like material run smoothly.

In order to gage multifilament textile yarn for size or denier, it has been found that running the yarn through a V-shaped guide or fixture shown schematically in FIG. 10, of the proper angle is a satisfactory method of handling this type of material. This angle is calculated so that the height 280 of the triangular cross-section assumed by the bundle of filaments is the same as the diameter 281 of a bundle of circular cross-section as shown in FIGS. 9 and 10. In this way both shapes present the same profile to the light beam and change in cross-section fairly well represents a change in yarn denier. The V-shaped guide through which the yarn runs is very precisely made so that the angle is accurate and the apex of the V is perfectly sharp with no space between the mating surfaces in which a single filament can be caught.

Strand-like material composed of a single strand or tightly twisted multistrand material are checked by the apparatus for roundness by holding the material in a suitable fixture, not shown, in which the material is rotated in the light beam.

Liquids, solutions, dispersions, mixtures, emulsions, etc. are tested for light transmission, which is usually a measure of concentration to a high degree of accuracy since the apparatus according to the invention can effect changes in light sensitivity of about 0.02% which in most cases represent a very small change in concentration of a liquid. Such tests are conducted by filling a glass cell, preferably provided with flat sides since any curvature of the sides would tend to act as a lens system. In the event a series of tests are being made it is apparent that the cells preferably should have the same thickness dimension and be composed of sides of the same thickness so that the light path length of both the glass and liquid is the same in all cases.

It is readily apparent to those skilled in the art that continuous monitoring of solution or mixture strength can be accomplished by running a tube or pipe, not shown, with flat windows in opposite sides through the measuring zone of the gage and running the liquid through it.

The gage is usable as an area measuring device in making linear, contour or whole size measurements, for example, in measuring an aperture in spinnerettes, not shown. The object having the hole is held in the same position that the standard was held.

A fixture mounting surface 285 parallel to the opposite axis of measuring light beam is provided on which holding and guiding devices can be attached so that solutions to gaging problems can be arrived at by the use of a proper holding fixture to fit the gaging problem on hand.

While a preferred embodiment of the gage according to the invention has been shown and described, it will be understood that many modifications and changes can be made within the scope of the invention.

What we claim and desire to secure by Letters Patent is:

1. A comparative photoelectric gage for automatically gaging and measuring plus and minus deviations from preselected desired respective values of preselected physical properties of a material or substance and for measuring plus and minus deviations of physical characteristics of given articles of manufacture alternatively in a static or a dynamic condition comprising, a light source having a filament and an optical system cooperative with said light source providing a measuring beam of light and means defining a light passage area for directing a preselected cross-sectional measuring area of said measuring beam of light to a measuring and gaging zone in which an article is received in operation for photoelectrically measuring deviations from a preselected, desired value of a preselected physical variable thereof, photoelectric means responsive to light including a pair of photoelectric transducer means having photoresponsive surfaces disposed to receive light from said source and from said light beam measuring area respectively to develop an output in operation, means connecting said transducer means cooperatively in a variable balanced output condition corresponding to an adjusted set condition of operation in which the balanced output corresponds to a preselected value of the physical variable being measured when a preselected profile area of said article is disposed in said zone in said measuring area of said measuring light beam, said optical system having means to transmit an image of at least a portion of said filament in said measuring beam of light on one of said transducer means to constantly illuminate a given photoresponsive area of constant dimensions on said photoresponsive surfaces of said one transducer, compensating means comprising the other transducer means and means to control both the area and intensity of light energy impinging on said other transducer means to match decay curves of both of said transducer means, and output means for receiving in operation any output imbalance between the two transducer means due to lesser or greater interruption of light rays in said measuring area of the beam than are interrupted at said balanced output condition and due to deviation of the variable being measured from the desired value thereof.

2. A comparative photoelectric gage for automatically gaging and measuring plus and minus deviations from preselected desired respective values of preselected physical properties of a material or substance and for measuring plus and minus deviations of physical characteristics of given articles of manufacture alternatively in a static or a dynamic condition comprising, a light source having a filament and an optical system cooperative with said light source providing a measuring beam of light and means defining a light passage area for directing a preselected cross-sectional measuring area of said measuring beam of light to a measuring and gaging zone in which an article is received in operation for photoelectrically measuring deviations from a preselected, desired value of a preselected physical variable thereof, photoelectric means responsive to light including a pair of photoelectric transducer means having photoresponsive surfaces disposed to receive light from said source and from said light beam measuring area respectively to develop an output in operation, means connecting said transducer means cooperatively in a variable balanced output condition corresponding to an adjusted set condition of operation in which the balanced output corresponds to a preselected value of the physical variable being measured when a preselected profile area of said article is disposed in said zone in said measuring area of said measuring light beam, said optical system having means to transmit an image of at least a portion of said filament on one of said transducer means to constantly illuminate a given photoresponsive area of constant dimensions on said photoresponsive surface of said one transducer, and output means for receiving in operation any output imbalance between the two transducer means due to lesser or greater interruption of light rays in said measuring area of the beam than are interrupted at said balanced output condition and due to deviation of the variable being measured from the desired value thereof.

3. A comparative photoelectric gage for automatically gaging and measuring plus and minus deviations from preselected desired respective values of preselected physical properties of a material or substance and for measuring plus and minus deviations of physical characteristics of given articles of manufacture alternatively in a static or a dynamic condition comprising, a light source having a filament and an optical system cooperative with said light surce providing a measuring beam of light and means defining a light passage area for directing a preselected cross-sectional measuring area of said measuring beam of light to a measuring and gaging zone in which an article is received in operation for photoelectrically measuring deviations from a preselected, desired value of a preselected physical variable thereof, photoelectric means responsive to light including a pair of photoelectric transducer means having photoresponsive surfaces disposed to receive light from said source and from said light beam measuring area respectively to develop an output in operation, means connecting said transducer means cooperatively in a variable balanced output condition corresponding to an adjusted set condition of operation in which the balanced output corresponds to a preselected value of the physical variable being measured when a preselected profile area of said article is disposed in said zone in said measuring area of said measuring light beam, said optical system having means to transmit an image of at least a portion of said filament on one of said transducer means to constantly illuminate a given photoresponsive area of given dimensions on said photoresponsive surface of said one transducer, compensating means comprising the other transducer means and means to control both the area and intensity of light energy impinging on said other transducer means to match decay curves of both of said transducer means, and output means for receiving in operation any output imbalance between the two transducer means due to lesser or greater interruption of light rays in said measuring area of the beam than are interrupted at said balanced output condition and due to deviation of the variable being measured from the desired value thereof.

4. A comparative photoelectric gage for automatically gaging and measuring plus and minus deviations from preselected desired respective values of preselected physical properties of a material or substance and for measuring plus and minus deviations of physical characteristics of given articles of manufacture alternatively in a static or a dynamic condition comprising, a light source having a filament and an optical system cooperative with said light source providing a measuring beam of light and means defining a light passage area for directing a preselected cross-sectional measuring area of said measuring beam of light to a measuring and gaging zone in which an article is received in operation for photoelectrically measuring deviations from a preselected, desired value of a preselected physical variable thereof, photoelectric means responsive to light including a pair of photoelectric transducer means comprising two photomultipliers having photoresponsive surfaces disposed to receive light from said source and from said light beam measuring area respectively to develop an output in operation, means connecting said two photomultipliers cooperatively in a variable balanced output condition corresponding to an adjusted set condition of operation in which the balanced output corresponds to a preselected value of the physical variable being measured when a preselected profile area of said article is disposed in said zone in said measuring area of said measuring light beam, said optical system having means to transmit an image of at least a portion of said filament on one of said photomultipliers to constantly illuminate a given photoresponsive area of constant dimensions on said photoresponsive surface of said one photomultiplier, compensating means comprising the other photomultipler said light source and means to control both the area and intensity of light energy impinging on said other photomultiplier to match decay curves of both of said photomultipliers, and output means for receiving in operation any output imbalance between the two transducer means due to lesser or greater interruption of light rays in said measuring area of the beam than are interrupted at said balanced output condition and due to deviation of the variable being measured from the desired value thereof.

References Cited by the Examiner

UNITED STATES PATENTS

| | | | |
|---|---|---|---|
| 2,641,960 | 6/53 | Strother | 250—219 |
| 2,699,701 | 1/55 | Strother et al. | 250—219 |
| 2,834,247 | 5/58 | Pickels | 250—237 X |
| 2,982,860 | 5/61 | Nehrbas | 250—207 |
| 2,995,978 | 8/61 | Glandon et al. | 250—207 X |
| 3,016,787 | 1/62 | Brehm | 250—207 X |

RALPH G. NILSON, *Primary Examiner.*

RICHARD M. WOOD, ARCHIE R. BORCHELT,
*Examiners.*